US009130904B2

(12) United States Patent
Savini et al.

(10) Patent No.: US 9,130,904 B2
(45) Date of Patent: Sep. 8, 2015

(54) EXTERNALLY AND INTERNALLY ACCESSING LOCAL NAS DATA THROUGH NSFV3 AND 4 INTERFACES

(71) Applicant: Texas Instruments Incorporated, Dallas, TX (US)

(72) Inventors: Patrice Savini, Cagnes-sur-Mer (FR); Francis Thaon, Vence (FR)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 26 days.

(21) Appl. No.: 13/895,701

(22) Filed: May 16, 2013

(65) Prior Publication Data
US 2014/0337965 A1 Nov. 13, 2014

(30) Foreign Application Priority Data
May 8, 2013 (EP) ..................... 13290104

(51) Int. Cl.
*H04L 29/06* (2006.01)
(52) U.S. Cl.
CPC ............ *H04L 63/0272* (2013.01); *H04L 63/08* (2013.01)
(58) Field of Classification Search
CPC .................................... H04L 63/0272
USPC .......................... 726/15, 12, 1, 26
See application file for complete search history.

(56) References Cited

U.S. PATENT DOCUMENTS

| 5,918,019 | A * | 6/1999 | Valencia ................... 709/227 |
|---|---|---|---|
| 6,356,863 | B1 * | 3/2002 | Sayle ..................... 703/27 |
| 6,557,037 | B1 * | 4/2003 | Provino ................... 709/227 |
| 6,693,878 | B1 * | 2/2004 | Daruwalla et al. ........... 370/235 |
| 6,754,712 | B1 * | 6/2004 | Valencia ................... 709/227 |
| 7,269,848 | B2 | 9/2007 | Seshadri |
| 7,269,849 | B2 | 9/2007 | Savini |
| 7,933,976 | B2 * | 4/2011 | Ganesh et al. ............. 709/220 |
| 8,326,449 | B2 * | 12/2012 | Hartz et al. ............... 700/200 |
| 8,396,836 | B1 * | 3/2013 | Ferguson et al. ........... 707/652 |
| 8,763,005 | B2 * | 6/2014 | Staelin et al. ............. 718/105 |
| 2002/0023210 | A1 * | 2/2002 | Tuomenoksa et al. ....... 713/161 |
| 2002/0056008 | A1 * | 5/2002 | Keane et al. .............. 709/245 |
| 2002/0099826 | A1 * | 7/2002 | Summers et al. ........... 709/227 |

(Continued)

OTHER PUBLICATIONS

Don Brace et al, "Compaq's New Engineering Compute Farm Environment: Moving Forward with Windows NT", Proceedings of the Large Installation System Administration of Windows NT Conference, pp. 1-16, Aug. 5-8, 1998, Seattle, Washington.

*Primary Examiner* — David García Cervetti
(74) *Attorney, Agent, or Firm* — Lawrence J. Bassuk; Frank D. Cimino

(57) ABSTRACT

A method for secure external access to a collaborative design system is provided that includes establishing a virtual private network (VPN) tunnel between an engagement virtual machine and an external computer system, wherein the external user provides a user id and password for authorization to establish the VPN tunnel, receiving the user id and password in a web interface of the collaborative design system and identifying the engagement virtual machine the external user is allowed to access based on the user id and password, prompting the external user to log into the engagement virtual machine, wherein the user id and password are again received from the external user, issuing a security ticket to the external user when the user logs into the engagement virtual machine, and using the security ticket to authenticate accesses initiated by the external user to engagement files stored in a file system in an intranet.

5 Claims, 4 Drawing Sheets

(56) References Cited

U.S. PATENT DOCUMENTS

| | | | |
|---|---|---|---|
| 2002/0129281 A1* | 9/2002 | Hatfalvi et al. | 713/201 |
| 2004/0165603 A1* | 8/2004 | D'Angelo et al. | 370/401 |
| 2006/0041761 A1* | 2/2006 | Neumann et al. | 713/189 |
| 2007/0127500 A1* | 6/2007 | Maeng | 370/395.52 |
| 2007/0204153 A1* | 8/2007 | Tome et al. | 713/164 |
| 2007/0204166 A1* | 8/2007 | Tome et al. | 713/182 |
| 2007/0226320 A1* | 9/2007 | Hager et al. | 709/219 |
| 2007/0260873 A1* | 11/2007 | Hatfalvi et al. | 713/154 |
| 2007/0300220 A1* | 12/2007 | Seliger et al. | 718/1 |
| 2007/0300221 A1* | 12/2007 | Hartz et al. | 718/1 |
| 2009/0112965 A1* | 4/2009 | Ganesh et al. | 709/201 |
| 2009/0319915 A1* | 12/2009 | Bates et al. | 715/753 |
| 2011/0055915 A1* | 3/2011 | Hall et al. | 726/12 |
| 2012/0117565 A1* | 5/2012 | Staelin et al. | 718/1 |
| 2012/0233668 A1* | 9/2012 | Leafe et al. | 726/4 |
| 2012/0238247 A1* | 9/2012 | Wen et al. | 455/411 |
| 2012/0265976 A1* | 10/2012 | Spiers et al. | 713/2 |
| 2012/0278479 A1* | 11/2012 | Miller et al. | 709/224 |
| 2013/0085807 A1* | 4/2013 | Cincotta | 705/7.32 |
| 2013/0152156 A1* | 6/2013 | Allison et al. | 726/1 |
| 2014/0071983 A1* | 3/2014 | Banavalikar et al. | 370/389 |
| 2014/0098731 A1* | 4/2014 | Maaref et al. | 370/312 |

* cited by examiner

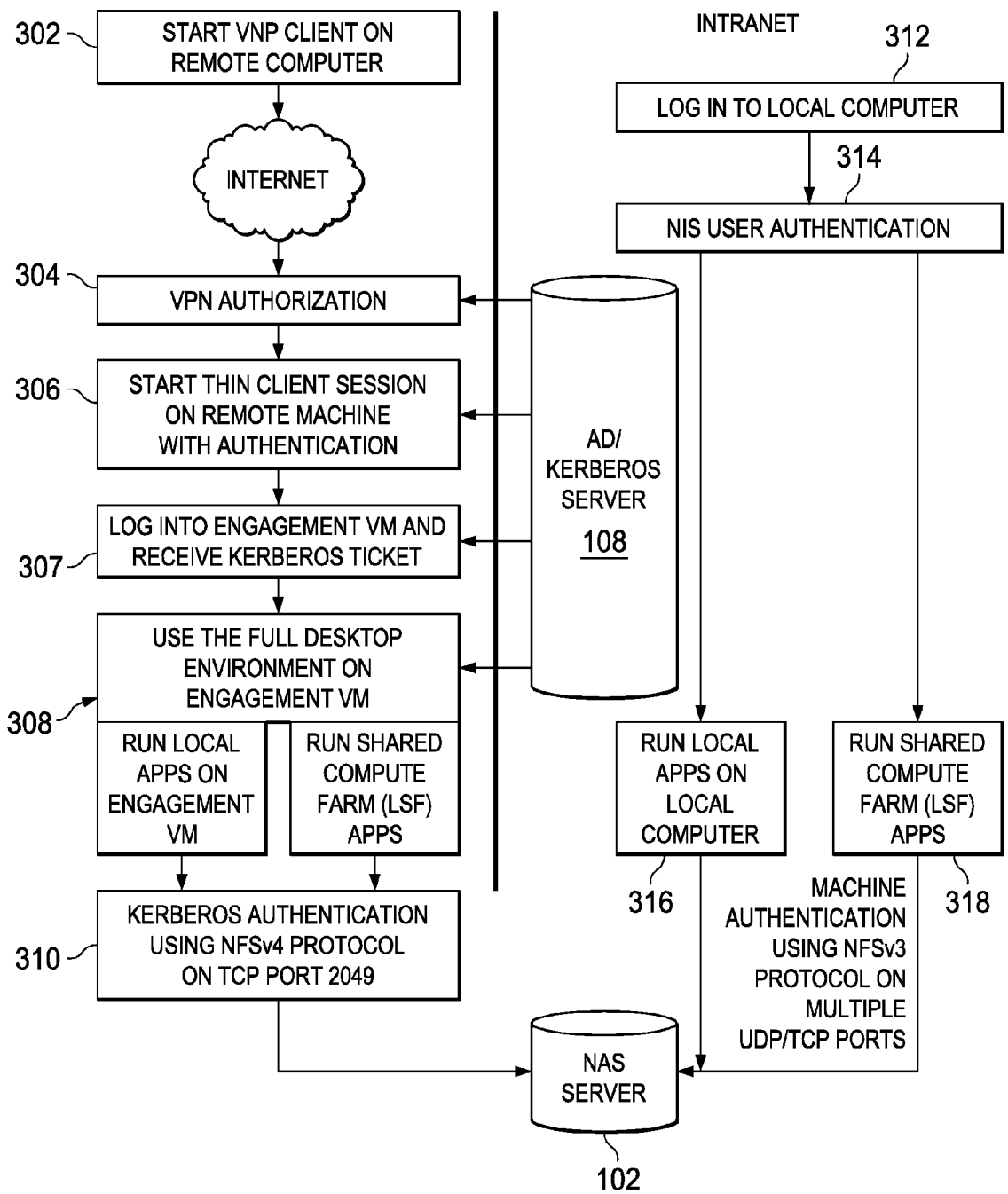

EXTERNALLY AND INTERNALLY ACCESSING LOCAL NAS DATA THROUGH NSFV3 AND 4 INTERFACES

CROSS-REFERENCE TO RELATED APPLICATIONS

This application claims benefit of European Patent Application number EP 13290104.2, filed May 8, 2013, which is incorporated by reference herein.

This application is related to U.S. Pat. No. 7,269,849, granted Sep. 11, 2007, and U.S. Pat. No. 7,269,848, granted Sep. 11, 2007, which are incorporated by reference herein.

BACKGROUND OF THE INVENTION

1. Field of the Invention

Embodiments of the present invention generally relate to external access to a development environment of a company such as an integrated circuit manufacturer with secure access to data on the intranet of the company.

2. Description of the Related Art

Collaboration on system designs between integrated circuit manufacturers and their partners, e.g., customers, sub-contractors, electronic design automation (EDA) vendors, and suppliers, is critical for reducing the time to market. Thus, systems for making such collaborations faster, easier, cheaper, and more accurate interactions are important. Sharing of compute resources, e.g., design resources, is one way that this collaboration can be improved. In the sharing of compute resources with outside parties such as customers and suppliers, it is critical that the intellectual property of the integrated circuit manufacturer is not compromised. The above referenced patents describe one example a system that allows secure sharing of a manufacturer's design system computing environment while protecting the intellectual property of the manufacturer and the partners. However, improvements to such systems are desirable.

SUMMARY

Embodiments of the present invention relate to methods and systems for secure collaborative design. In one aspect, a method for secure external access to a collaborative design system that includes establishing a virtual private network (VPN) tunnel between an engagement virtual machine included in the collaborative design system and an external computer system used by an external user, wherein the external user provides a user id and password for authorization to establish the VPN tunnel, receiving the user id and password of the external user in a web interface of the collaborative design system, identifying the engagement virtual machine the external user is allowed to access based on the user id and password, prompting the external user to log into the engagement virtual machine, wherein the user id and password are again received from the external user, issuing a security ticket to the external user when the user logs into the engagement virtual machine, and using the security ticket to authenticate accesses initiated by the external user to engagement files stored in a file system included in an intranet of the collaborative design system.

In one aspect, a collaborative design system is provided that includes means for establishing a virtual private network (VPN) tunnel between an engagement virtual machine included ed in the collaborative design system and an external computer system used by an external user, wherein the external user provides a user id and password for authorization to establish the VPN tunnel, means for receiving the user id and password of the external user in a web interface of the collaborative design system, means for identifying the engagement virtual machine the external user is allowed to access based on the user id and password, means for prompting the external user to log into the engagement virtual machine, wherein the user id and password are again received from the external user, means for issuing a security ticket to the external user when the user logs into the engagement virtual machine, and means for using the security ticket to authenticate accesses initiated by the external user to engagement files stored in a file system included in an intranet of the collaborative design system.

BRIEF DESCRIPTION OF THE DRAWINGS

Particular embodiments will now be described, by way of example only, and with reference to the accompanying drawings:

FIG. 3 is a flow diagram illustrating the flow of the collaborative design system of FIG. 1 and FIG. 2.

DETAILED DESCRIPTION OF EMBODIMENTS OF THE INVENTION

Figure 1:
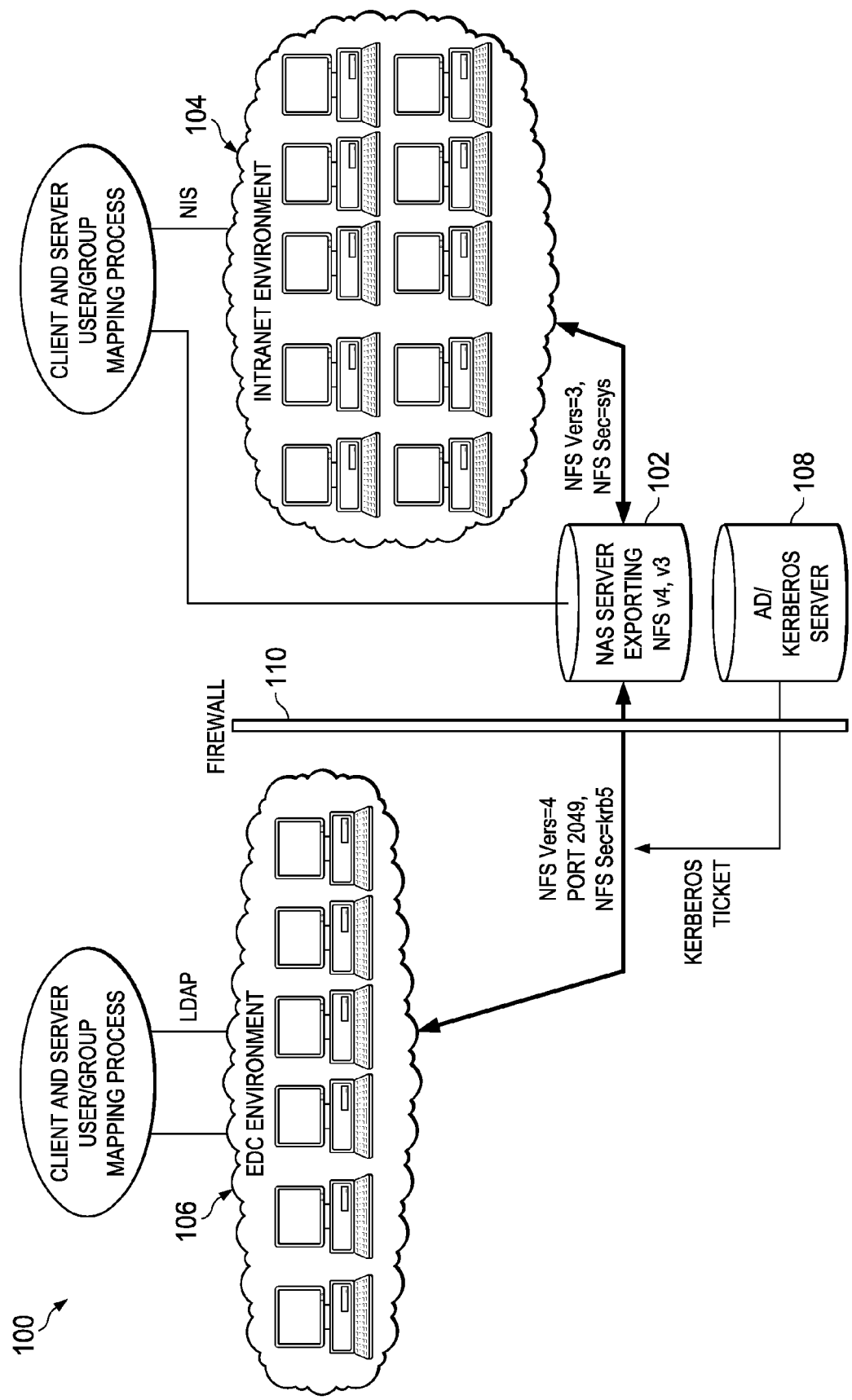
FIG. 1 is a high level block diagram of an example collaborative design system with secure file and data sharing between internal users and external users.

Specific embodiments of the invention will now be described in detail with reference to the accompanying figures. Like elements in the various figures are denoted by like reference numerals for consistency.

As previously mentioned, allowing external partners such as sub-contractors, customers, electronic design automation vendors, etc., to access a manufacturer's design systems without compromising intellectual property is desirable. Prior art collaborative design systems such as those described in the above referenced patents provide secure compartmentalized external access to a full suite of web-based services from design to production implemented by a manufacturer. External users may login to the manufacturer's secure network via the Internet and/or direct leased lines and internal users may login through the manufacturer's intranet. External users must pass through multiple layers of security. Once external users reach the compartmentalized "engagement zones", internal users and external users can, for example, work simultaneously in multiple teams, run simulation tests, emulate software problems and share intellectual property in a secure zone.

Such prior art systems maintain the network file system supporting the various shared projects within the intranet of the manufacturer and, due to security issues, replicate on a project-by-project basis the files and data shared between external and internal users. More specifically, the external users are not permitted to access the network file system in the intranet directly; rather, whatever files and data are needed for a particular collaborative project are replicated to a file server outside of the manufacturer's intranet that can be accessed by the external users. Meanwhile, the internal users working on the collaborative project use a copy of the files and data within the intranet. Such replication, with the attendant need to reconcile changes back into the network file system master version, complicate system administration and increase cost. Further, in such prior art systems, most authentication/validation for accessing files and data is based on the computer system accessing the files, rather than on the particular user, which makes allowing external access to the manufacturer's intranet-based network file system undesirable.

Embodiments of the invention provide a collaborative design system that permits external and internal users to securely share files and other data of a collaborative project stored in an intranet based network file system without compromising intellectual property of the host of the design system, e.g., the manufacturer, or the intellectual property involved in other collaborative projects. Further, single sign on authentication is provided and the authentication/validation for file and data access is per user for external users, rather than by computer system as in the prior art.

FIG. 1 shows a high level diagram of a collaborative design system 100 with secure file and data sharing between internal users and external users. Additional details regarding aspects of the collaborative design system are described herein relative to FIG. 2 and FIG. 3. The collaborative design system 100 includes an External Design Collaboration (EDC) environment 106, an intranet environment 104, a network attached storage (NAS) server 102 shared by the EDC environment 106 and the intranet environment 104, and an Active Directory (AD) domain controller (server) 108. The intranet environment 104, the NAS server 102, and the AD/Kerberos server 108 are in the intranet of the company hosting the collaborative design system 100, and are separated from the EDC environment by a firewall 110.

The intranet environment 104 is the host data center providing the intranet physical infrastructure and the infrastructure for accessing the Internet. The infrastructure includes the computer hardware, software, and other equipment needed to support the internal users of the collaborative design system 100, e.g., network equipment, NAS and SAN (storage area network) storage, various servers, email, a virtualization infrastructure, a configuration management infrastructure, security services, etc. The infrastructure includes a compute farm (server farm) for use by the internal users in joint design projects with external users.

The External Design Collaboration (EDC) environment 106 provides the infrastructure for external users to work on collaborative projects with internal users. This infrastructure includes the computer hardware, software, and other equipment needed to support collaborative design projects. The infrastructure includes a compute farm (server farm) for use by the external users in joint design projects with internal users. This infrastructure is described in more detail below in reference to FIG. 2.

The NAS server 102 exports Network File System (NFS) version 4 (NFSv4) protocol for the EDC environment 106 and NFSv3 protocol for the intranet environment 104. Thus, accesses to shared project files are made using NFSv4 from the EDC environment 106 and using NFSv3 protocol from the intranet environment 104. In general, NFS is an industry standard distributed file system protocol that allows users on client machines to access files stored on network devices in a similar fashion to accessing files stored on the respective client machines. The NFSv4 protocol uses a single Transmission Control Protocol (TCP) port, port 2049, for communication and, in the collaborative design system 100, is configured to use Kerberos security for external user authentication. Clients of the EDC environment 106 (external user machines) mount NFSv4 for project data using Kerberos security for user authentication and LDAP (lightweight directory protocol) for group authentication and file system access rights. Clients of the intranet environment 104 (internal user machines) mount NFSv3 for project data using Network Information Service (NIS). NIS is a client-server directory service protocol for user authentication and distribution of system configuration data on a network. LDAP is an industry standard protocol for accessing and maintaining distributed directory information services over an Internet protocol (IP) network.

The AD/Kerberos server 108 authenticates and authorizes all external users using the NAS server 102. Active Directory is a directory service created by Microsoft that provides a central location for network administration and security. The AD/Kerberos server 108 enforces security policies for external user access to the EDC environment 106 and for external user access via the EDC environment 106 to files and data on the NAS server 102. Active Directory makes use of the industry standard protocols Kerberos and the Domain Name System (DNS). DNS is used for naming computers, services, or any resource connected to the Internet or a private network such as an intranet and associating the names with network addresses. Kerberos is a computer network authentication protocol that works on the basis of "tickets" to allow nodes communicating over a non-secure network to prove their identity to one another in a secure manner.

External user information such as user id (UID), group id (GID), and home directories for accessing the NAS server 102 via NFS is stored in an LDAP directory on an LDAP server (not shown) along with NFS automount information. When an external user accesses the EDC environment 106, the AD/Kerberos server 108 authenticates the user and issues a Kerberos ticket to the authenticated user. This Kerberos ticket is then presented each time the external user performs an activity in the EDC environment 106 that accesses the NAS server 102. This process is explained in more detail below in reference to FIG. 3. On the intranet environment side, information such as UID, GID, and home directories for accessing the NAS server 102 via NFS are associated with a particular server in the intranet environment 104 rather than with individual users. The server information is stored in an LDAP directory and is used to authenticate server accesses to the NAS server 102.

Figure 2A:
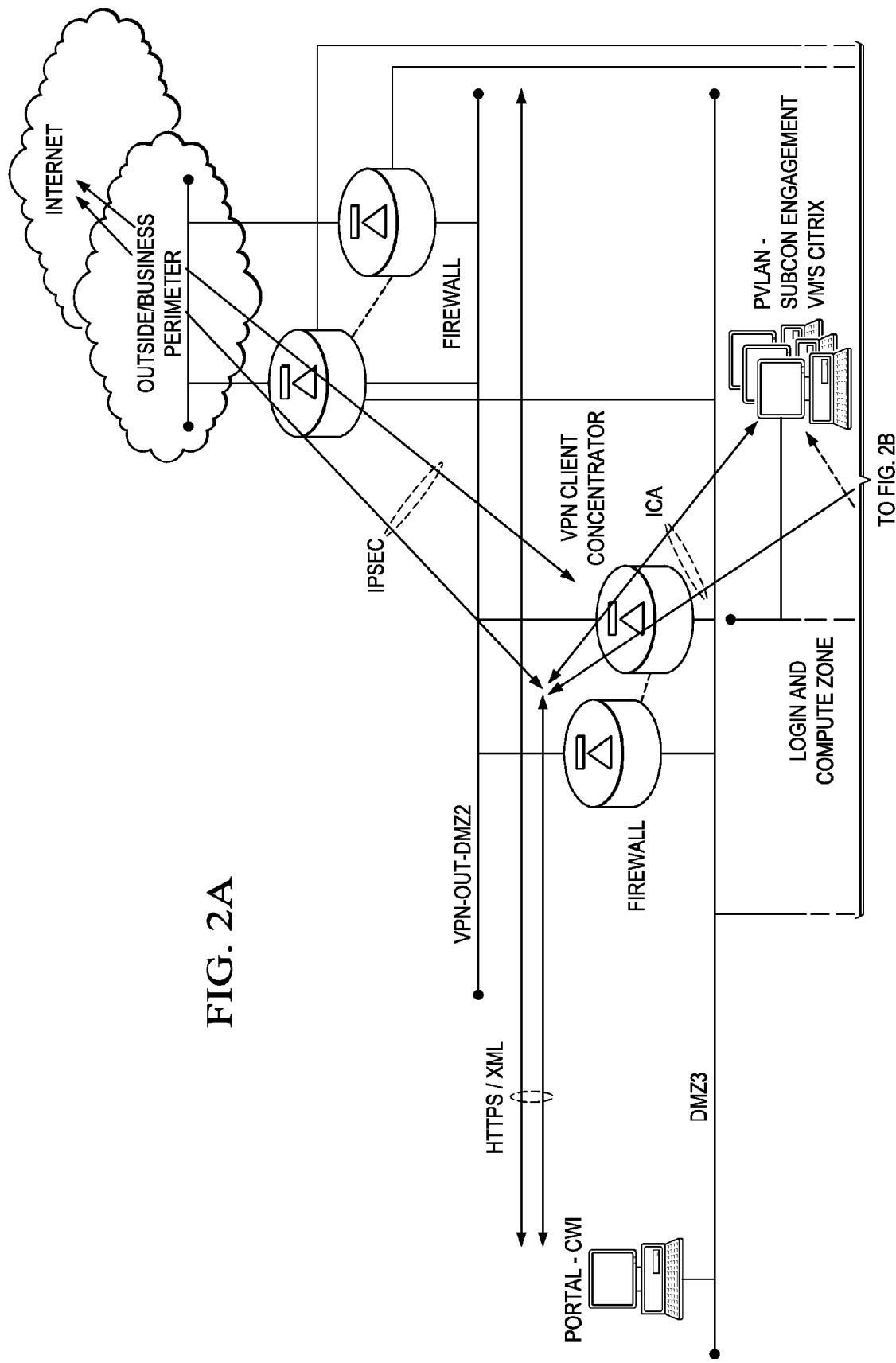
FIGS. 2A and 2B are a more detailed diagram of the collaborative design system of FIG. 1.
Figure 2B:
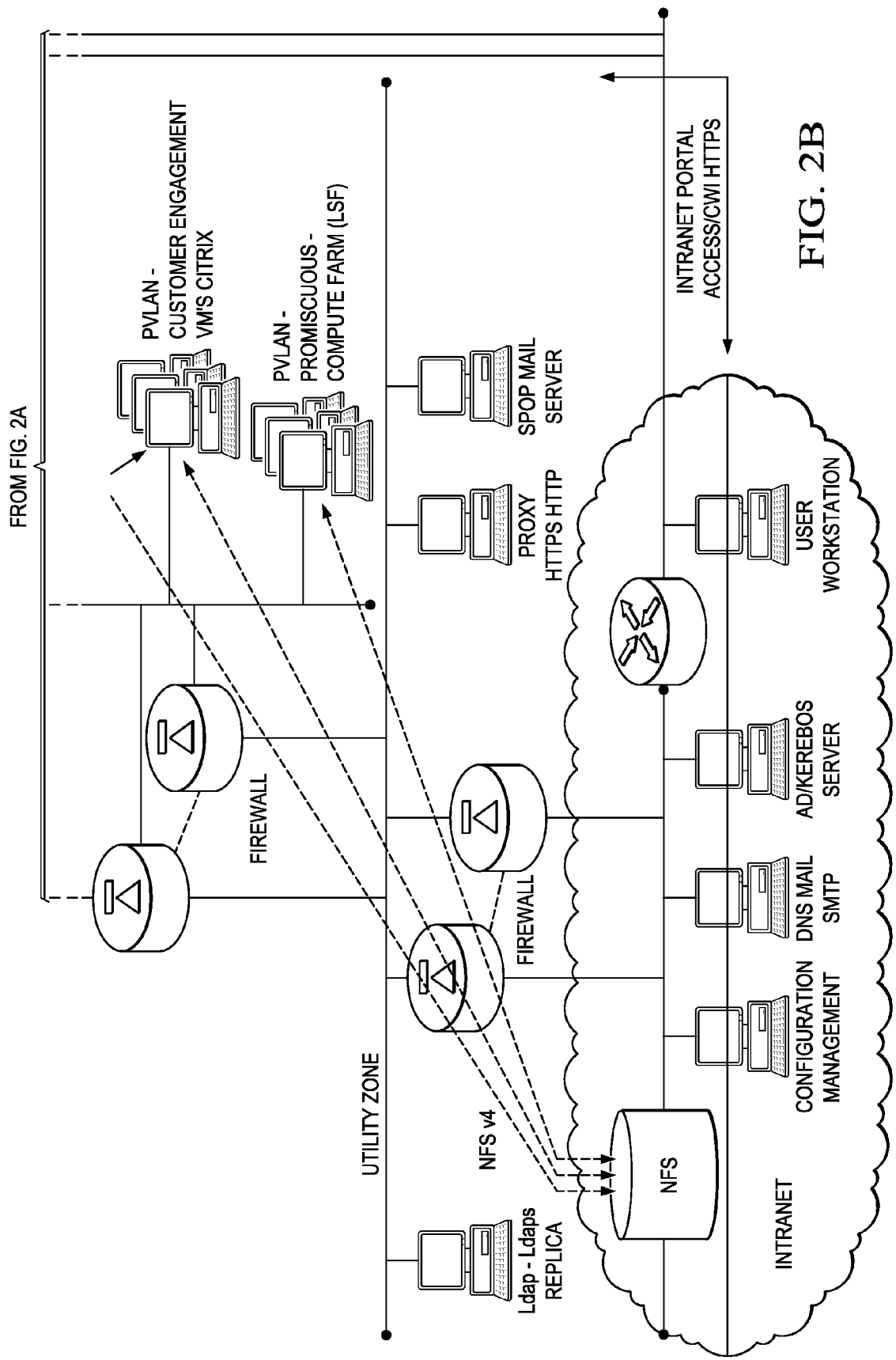

FIGS. 2A and 2B are a more detailed diagram of the collaborative design system 100, focusing primarily on the EDC environment 106 and illustrating the various protocols used for security. External user access the collaborative design system through the outside/business perimeter via the Internet. The access is provided via routers and Internet Protocol Security (IPsec) secured Virtual Private Network (VPN) connections. IPsec is an industry standard security protocol suite for IP communications. The VPN connections are enabled by VPN client software installed on the external user computer systems and the VPN client concentrator. The VPN clients works with the VPN concentrator to create a secure connection (tunnel) through the Internet to the collaborative design system. The VPN concentrator and the VPN client employ a strong encryption algorithm to encrypt any data transmitted from the client to the collaborative design system and vice versa.

Citrix thin client technology using the Citrix Independent Computing Architecture (ICA) protocol is employed to enable the external users to access engagement virtual machines (VMs) executing on computer clusters in the EDC environment 106. ICA (Independent Computing Architecture) is a proprietary protocol designed by Citrix Systems for passing data between Citrix enabled servers and Citrix clients. The use of Citrix enables the displays of the engagement VMs to be presented to the external users via a web browser on their computer systems as if the VMs were executing locally. The Citrix Web Interface (CWI) portal provides a web interface that external users use to access engagement VMs in the EDC environment 106 and a secure gateway service that manages the secure communication between Citrix clients executing on computers used by external users and Citrix servers executing on the VMs used by the external users. As is explained in more detail in reference to FIG. 3, the web interface is used to authenticate the external users and to enable authenticated external users to initiate sessions on the particular engagement VMs in the EDC environment 106 the users are authorized to use.

Subcontractor engagement VMs and customer engagement VMs execute on computer clusters in a login and compute network segment (zone). A subcontractor is generally a company/partner that the host company has engaged to provide additional design personnel for a project. A customer is generally a company/partner with which the host company is collaborating to co-develop products. Separate computer clusters are provided for subcontractors and customers to allow for different levels of data access. A VM may execute on one or more computer systems in a cluster and each subcontractor and each customer has its own VM. The operating system on the VMs may be any suitable operating system, e.g., UNIX, Linux, Windows, etc., and any applications available to the particular subcontractor or customer are installed on the VM or are remotely available within the EDC environment.

A compute farm accessible to the external users via the operating system executing on the VMs is also included in this network segment. This compute farm may be used by external users to execute various design applications, e.g., simulations and design placement, and is managed by load sharing software that understands Kerberos. One example of suitable load sharing software that may be used is the Load Sharing Facility (LSF) available from International Business Machines Corporation.

The computer clusters and the compute farm in the login and compute network segment are arranged in private virtual local area networks (PVLANs) to isolate engagement VMs from each other. In general, a PVLAN is a broadcast domain on a network configured such that all hosts on a VLAN can communication with others with in the same VLAN. PVLANs allow network traffic to be segments at the data-link layer, limiting the size of the broadcast domain, and therefore improving security. Thus, rather than requiring a network segment separated by a firewall to isolate engagements as in the prior art (which required additional hardware), the PVLANs are used to achieve similar security at the protocol level.

Each customer engagement VM is isolated in a PVLAN that includes the shared compute farm. For subcontractor engagement VMs, the shared compute farm is isolated in PVLAN in promiscuous mode and each subcontractor engagement VM is isolated in a PVLAN that accesses the shared compute farm PVLAN. In a PVLAN, promiscuous mode allows the PVLAN to be accessed by other PVLANs.

LDAP servers, the host intranet, i.e., the intranet environment 104, a proxy server, and an incoming (SPOP) mail server are provided in a utility network segment (zone). Access to the project files and data on the NAS server 102 from applications executing on the engagement VMs and the compute farm is via NFSv4 protocol in which each access is authenticated by a Kerberos ticket issued to the external user using the application. The utility network segment also includes a URL proxy server that acts as an intermediary between the EDC environment 106 and the intranet environment 104 to ensure security and administrative control and to provide access to Web sites residing on the intranet and to any services using HTTP/HTTPS protocols.

FIG. 3 is a flow diagram illustrating the flow of the collaborative design system 100 from the perspective of external users accessing the NAS server 102 via the EDC environment 106 and internal users accessing the NAS server 102 via the intranet environment 104. To access the collaborative design system 100, subcontractors and customers are assigned unique AD group ids and unique VPN group ids. Further, each external user of a subcontractor or a customer is assigned a unique user ID. Thus, each external user is identified by a user id, an AD group id, and a VPN group id. Each external user also has a password that is used to authenticate the user when starting a VPN tunnel, when accessing the web interface, and when logging into the engagement VM. The UID, GID, and password for each external user are stored on the LDAP servers. The user id and password of each external user is stored on the AD/Kerberos server 108.

To access the collaborative design system 100, an external user starts 302 a VPN client on a remote computer system and enters a user id and password. VPN authorization 304 of the external user is performed by the AD/Kerberos server 108. If authorized, a VPN tunnel is established between the user's computer system and the engagement VM the user is permitted to access. The particular engagement VM the user is permitted to access is identified by the user's VPN group id.

The external user then initiates 306 a Citrix thin client session on the remote computer system to access the engagement VM of the entity (subcontractor or customer) which employs the external user. To initiate the thin client session, the external user enters the address of the company server, i.e., the CWI portal, providing the web interface to the collaborative design system 100 in a web browser. The web interface requires the user to enter a user id and password for authorization to access the collaborative design system 100. The external user enters the same user id and password as used for VPN authorization. The user credentials are provided to a Citrix XML service in the EDC environment 106 that authorizes the user credentials and identifies the particular engagement VM the external user is allowed to use. Authorization of the user is performed by the AD/Kerberos server 108. If the user is authorized, the web interface presents an icon in the web browser that the external user may select to access the desktop of the engagement VM.

Upon selection of the icon, a Citrix session ticket is issued to the user, and the external user is prompted to log in 307 to the particular engagement VM. The external user enters the same user id and password as above. The engagement VM submits the user credentials to the AD/Kerberos server 108 for authorization. The AD/Kerberos server 108 issues a Kerberos ticket to the user. Note that each level of authorization, the external user uses the same user id and password. Thus, single sign on authorization is provided for each external user.

Once the external user is authorized 307 to the engagement VM, the external user has access 308 to a full desktop environment on the engagement VM on the external user's computer system. The external user may execute local applications (e.g., EDA tools, mail, editors, etc.) on the engagement VM and/or execute applications (e.g., EDA tools) on the shared compute farm managed by the Kerberos-enabled LSF. Any applications executed by the external user, either on the engagement VM or the compute farm, present 310 the Kerberos ticket issued to the external user to the NFSv4 interface of the NAS server 102 for authentication to access the project files and data of the collaborative project stored on the NAS server 102. Further, when the external user initiates an application on the compute farm via LSF, the issued Kerberos ticket is presented to the LSF server to be used for access to the NAS server 102. The needed authentications are performed by the AD/Kerberos server 108.

An internal user working on a collaborative project with one or more external users of a subcontractor or customer logs into 312 a local computer system. Authentication 314 of the internal user is performed using NIS. Once authenticated 314, the internal user may execute local applications (e.g., EDA tools, mail, editors, etc.) on the local computer system and/or execute applications (e.g., EDA tools) on the shared compute farm in the intranet environment 104. Any applications executed by the internal user, either on the local computer system or the compute farm, use machine authentication via the NFSv3 interface of the NAS server 102 to access the project files and data of the collaborative project stored on the NAS server 102.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, embodiments have been described in which the network attached storage server provides an NFSv4 interface to external users and an NFSv3 interface to internal users. One of ordinary skill in the art will understand embodiments in which the NFSv3 interface is not provided and internal users also access the NAS server using NFSv4. Further, one of ordinary skill in the art will understand embodiments in which some internal users use NFSv3 and other internal users use NFSv4.

In another example, embodiments have been described herein in which Kerberos is used for external user authentication to access shared files stored on an intranet-based file server. One of ordinary skill in the art will understand embodiments in which another suitable security protocol, now known or available in the future, may be used that provides secure ticket-based access via a single TCP port for external users to shared project files and data stored on a file server in an intranet.

In another example, embodiments have been described herein in which Citrix is used for the secure thin client access by external users. One of ordinary skill in the art will understand embodiments in which other suitable thin clients, now known or available in the future, may be used for external user access. For example, the NoMachine or VNC (Virtual Network Computing) desktop virtualization and thin client may be used in lieu of Citrix in some embodiments.

In another example, embodiments have been described herein in which the Kerberos enabled LSF is used for the shared compute farm. One of ordinary skill in the art will understand embodiments in which other Kerberos enabled load sharing applications are used to manage the computation load for the shared compute farm, e.g., SGE (Sun Grid Engine (also referred to as Oracle Grid Engine), Ubuntu cloud, and Buildforge.

In another example, embodiments have been described herein in which IPsec secured VPN connections are used. One of ordinary skill in the art will understand embodiments in which other suitable security protocols, now known or available in the future, may be used in the VPN connection. For example, the Secure Sockets Layer (SSL) protocol may be used in some embodiments.

In another example, embodiments have been described herein in which Active Directory is used to authenticate external users and to authorize external uses to access the NAS server. One of ordinary skill in the art will understand embodiments in which other suitable directory services, now known or available in the future, may be used for external user authentication and authorization, e.g., Oracle Internet Directory and eDirectory from Novell.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

It is therefore contemplated that the appended claims will cover any such modifications of the embodiments as fall within the true scope of the invention.

What is claimed is:

1. A process comprising:
    (A) assigning from an active directory/Kerberos server to an external user of a collaborative design system a unique external user identification, a unique group identification, and a unique virtual private network identification;
    (B) receiving from an external user computer a request to establish a virtual private network between the external user computer and a local engagement virtual machine that the external user is authorized to access, the receiving including identifying a particular local engagement virtual machine by the external user's group identification;
    (C) establishing a virtual private network tunnel between the external user computer and the particular local engagement virtual machine through a firewall separating the external computer user and the particular local engagement virtual machine;
    (D) receiving the external user identification in a local active directory/Kerberos server to authorize and log the external user computer onto the particular local engagement virtual machine;
    (E) issuing a Kerberos ticket from the active directory/Kerberos server to the external user computer in response to authorization;
    (F) accessing project files and data of the collaborative design system stored on a local network attached storage server by the external user computer through an NSFv4 interface of the local network attached storage server, including presenting the Kerberos ticket from the external user computer through the NFSv4 interface to the local network attached storage server for authenticating the external user computer to access the project files and data of the a collaborative design system stored on the local network attached storage server;
    (G) receiving log in information from an internal user computer in a local computer system coupled to the local network attached storage server and authenticating the log in information using a network information service; and
    (H) accessing the project files and data of the collaborative design system stored on the local network attached storage server by the internal user computer through an NSFv3 interface of the network attached server without a Kerberos ticket.

2. The process of claim 1 in which the establishing includes establishing a virtual private network tunnel between the external user computer and a particular virtual private local area network.

3. The process of claim 1 including running local applications on the external user computer via the particular engagement virtual machine.

4. The process of claim 1 including running shared compute farm applications from the external user computer via the particular engagement virtual machine.

5. The process of claim 1 including running local applications on the internal user computer and running shared compute farm applications through the local computer system.

* * * * *